United States Patent [19]
Bamford

[11] Patent Number: 5,964,567
[45] Date of Patent: Oct. 12, 1999

[54] SKID STEER LOADER VEHICLE

[76] Inventor: Joseph Cyril Bamford, Les Tourelles, Bon Port 15, CH-1820 Territet, Switzerland, 1820

[21] Appl. No.: 09/021,250

[22] Filed: Feb. 10, 1998

[30] Foreign Application Priority Data

Aug. 23, 1997 [GB] United Kingdom .................. 9717892

[51] Int. Cl.[6] ...................................................... B62D 11/08
[52] U.S. Cl. .......................... 414/685; 280/6.2; 280/6.48
[58] Field of Search ..................................... 180/6.2, 6.48, 180/6.54; 414/680, 685, 686

[56] References Cited

U.S. PATENT DOCUMENTS

| | | |
|---|---|---|
| 2,257,772 | 10/1941 | Wolf . |
| 3,810,517 | 5/1974 | Hurlburt et al. ......................... 180/6.2 |
| 4,055,262 | 10/1977 | Bauer et al. . |
| 4,074,782 | 2/1978 | Bauer . |
| 4,493,385 | 1/1985 | Shiber ..................................... 180/6.2 |
| 4,784,232 | 11/1988 | Leboime .................................. 180/6.2 |
| 4,875,535 | 10/1989 | Parker ..................................... 180/6.2 |
| 5,240,366 | 8/1993 | Bamford ................................. 414/686 |
| 5,590,737 | 1/1997 | Azuma et al. .......................... 180/6.48 |

FOREIGN PATENT DOCUMENTS

| | | |
|---|---|---|
| 0311853 A2 | 4/1989 | European Pat. Off. . |
| 0443830 | 8/1991 | European Pat. Off. . |
| 0443830 B1 | 11/1994 | European Pat. Off. . |
| 2241686 | 9/1991 | United Kingdom . |

*Primary Examiner*—Christopher P. Ellis
*Assistant Examiner*—Gregory A. Morse
*Attorney, Agent, or Firm*—Marshall, O'Toole, Gerstein, Murray & Borun

[57] ABSTRACT

A skid steer loader vehicle comprising a body having a front end and a rear end and provided with first and second ground engageable propulsion wheels respectively disposed on opposite sides of the vehicle and in which the first and second propulsion wheels are driven by first and second transmission systems respectively to permit the vehicle to be propelled and steered by driving the propulsion wheels on one side of the vehicle independently from the propulsion wheels on the other side of the vehicle, an operator's compartment and a boom assembly, the boom assembly having, at an outer end thereof, connecting structure for connecting a material handling implement to the boom assembly and an inner end of the boom assembly being pivotally mounted on the body, adjacent the rear end of the body, for movement between a raised position and a lowered position in which the boom assembly extends forwards alongside the operator's compartment and the material handling implement is disposed forward of the front end of the body and a transmission case, disposed on one side of the vehicle, having therein said first and second transmission systems.

18 Claims, 7 Drawing Sheets

SKID STEER LOADER VEHICLE

FIELD OF INVENTION

This invention relates to a skid steer loader vehicle hereinafter referred to as "of the kind specified" comprising a body having a front end and a rear end and provided with first and second ground engageable propulsion means respectively disposed on opposite sides of the vehicle and in which the first and second propulsion means are driven by first and second transmission means respectively to permit the vehicle to be propelled and steered by driving the propulsion means on one side of the vehicle, independently from the propulsion means on the other side of the vehicle an operator's compartment and a boom assembly, the boom assembly having, at an outer end thereof, connecting means for connecting a material handling implement to the boom assembly and an inner end of the boom assembly being pivotally mounted on the body, adjacent the rear end of the body, for movement between a raised position and a lowered position in which the boom assembly extends forwards alongside the operator's compartment and the material handling implement is disposed forward of the front end of the body.

DESCRIPTION OF THE PRIOR ART

A skid steer loader vehicle of the kind specified is disclosed in U.S. Pat. No. 4,055,262. That vehicle has a single transmission case means in which the first and second transmission means are disposed and which requires the operator to straddle the transmission case means when the operator is seated in the vehicle.

In addition the boom assembly comprises two spaced lift arm assemblies disposed on opposite side of the vehicle with a material handling implement extending there between forward of the front of the vehicle when in a lowered position. Access to an operator's compartment is gained through the front of the compartment by negotiating the implement.

EP 0,443,830B also discloses a skid steer loader vehicle of the kind specified. In that vehicle there are two transversely spaced transmission case means, each containing a single transmission means and disposed apart on opposite sides of the vehicle between which the operator is disposed. In addition the vehicle has a single lift arm assembly which extends forwardly along one side only of the operator's compartment. In such a vehicle although the front access of U.S. Pat. No. 4,055,262 is avoided, since it is possible for the operator to gain access to the operator's compartment from the side of the vehicle, it is necessary for the operator to negotiate one of the transmission case means. In addition visibility to the rear is partly impeded by the presence of a pivot member for the lift aim assembly which extends transversely across the rear of the body so as to be pivotally mounted on the body at the opposite sides thereof.

SUMMARY OF INVENTION

An object of the invention is to provide a skid steer loader vehicle of the kind specified whereby the above mentioned problems are overcome or are reduced.

According to the invention we provide a skid steer loader vehicle of the kind specified comprising a transmission case means, disposed on one side of the vehicle, having therein said first and second transmission means.

The first transmission means may comprise a first drive member projecting from one side of the transmission case means and drivingly connected to the first ground engageable propulsion means and the second transmission means comprises a second drive member projecting from the opposite side of the transmission case means and extending transversely across the vehicle so as to be drivingly connected to the second ground engageable propulsion means.

The first transmission means may comprise a front first drive member and rear first drive member each projecting from one side of the transmission case means and drivingly connected to the first ground engageable propulsion means and the second transmission means comprising a front first drive member and a rear second drive member projecting from the opposite side of the transmission case means and extending transversely across the vehicle and drivingly connected to the second ground engageable propulsion means.

Each drive member may be drivingly connected to a respective driven wheel which is driven from a drive element, preferably by a drive loop.

The transmission case means may comprise a pair of spaced, preferably parallel, side walls between which said first and second transmission means are disposed.

The side walls may be joined by top and bottom walls and by opposite end walls.

The side walls may be provided with extension parts which comprise side walls of an upright disposed on said one side of the vehicle and providing, in an upward region thereof, a pivotal mounting means for a boom assembly comprising a single lift aim assembly which extends forwardly along one side only of the operator's compartment when in said lowered position.

Each ground engageable propulsion means may comprise two ground engageable wheels or an endless track entrained around a pair of guide wheels.

The ground engageable propulsion means, when comprising ground engageable wheels may be arranged so that each ground engageable propulsion wheel of the first ground engageable propulsion means is carried at an outer end of a stub axle which is housed, so as to be rotatable about an axis of rotation, in a stub axle housing member mounted on the body, said stub axle providing, or being drivingly connected, to a said drive member of the first transmission means.

Each second ground engageable propulsion wheel of the second ground engageable propulsion means may be carried at an outer end of an elongate axle which is housed, so as to be rotatable about an axis of rotation, in an elongate axle housing member mounted on the body.

The stub axle housing member may be mounted on said one wall of the transmission case means.

The elongate axle housing may be mounted in an aperture of said opposite wall of the transmission case means adjacent one end and in an aperture or other mounting arrangement provided on an opposite side of the body.

The body may be provided at said one side with said transmission case means and on the opposite side of the body with an opposite side wall which may have therein a downwardly extending recess between the front and rear second drive members to provide access to a region of the body disposed between said opposite sides.

The transmission case means and the opposite side walls of the body may be interconnected by front and rear transversely extending parts of the body. The rear transversely extending part may be disposed forwardly of the rear of the body to provide an engine compartment between side portions of the body adjacent the rear thereof.

Said rear transversely extending part may be disposed in front of said rear drive members.

The or each drive loop may comprise a chain such as roller chain and the drive elements and driven wheels may comprise sprockets for engagement with the chain.

Alternatively, the or each drive loop may comprise a toothed or untouched belt and the drive elements and driven wheels comprise cooperating pulleys.

The drive element may be carried on an output shaft of a motor, or a shaft driven by an output shaft of a motor.

Each motor may be mounted on the same side of the transmission case means as each other.

Each motor may be mounted on the outer or, preferably, the inner wall of the transmission case means so as to be disposed outwardly of the case means with the drive element disposed within the transmission case means.

A vehicle embodying the present invention thus provides easy access to the operators compartment from said other side of the vehicle without requiring the operator to negotiate a transmission case means. The vehicle is provided with improved structural integrity by providing the single tower as described hereinbefore as an extension of the transmission case means allows the input from the loader to be transmitted to the transmission car. In addition the single tower upright provides improved visibility to the rear of the vehicle by virtue of avoiding a pivot member which extends transversely across the rear of the vehicle.

The provision of each motor on the same inner wall of the transmission case means has the advantages of improved protection, a minimised wheel base is possible as there is no intrusion between the tyres of the wheels, servicing is easier and hose runs are easier.

DESCRIPTION OF THE DRAWINGS

An example of the invention will now be described with reference to the accompanying drawings wherein.

Referring now to the drawings a skid steer loader vehicle 10 comprises a body 11 having a front end 12 and a rear end 13.

DESCRIPTION OF THE PREFERRED EMBODIMENT

The body 11 is provided with first ground engageable propulsion means 14 comprising a front ground engageable wheel 15 and a rear ground engageable wheel 16 and, on the opposite side of the body, a second ground engageable propulsion means 17 similarly comprising a rear wheel 18 and a front wheel 19. The vehicle 10 may be propelled in a straight line forwardly or rearwardly by driving all four wheels at the same speed, or, to steer the vehicle, by driving the wheels 15, 16 of the first ground engageable propulsion means 14 at a different speed and/or direction than the wheels 17, 18 of the second ground engageable means 19. Such skid steer loaders have a high degree of manoeuvrability and to facilitate skid steering and in particular, for example, the ability of the vehicle to turn about a central axis of the ground engageable propulsion means the wheel base is made, in the present example, slightly shorter than the track of the vehicle although, if desired, the wheel base may be the same or longer than the track if desired.

The wheels 15, 16 are carried on hubs 20, non-rotatably fixed to stub axles 21 which are rotatably carried in stub axle housing members 22 by bearings 22a and provide first drive members.

The wheels 18, 19 are carried on hubs 23, non-rotatably fixed to elongate axles 24 which are rotatably mounted in elongate tubular axle housings 25 by bearings 25a and provide second drive members.

Figure 4:
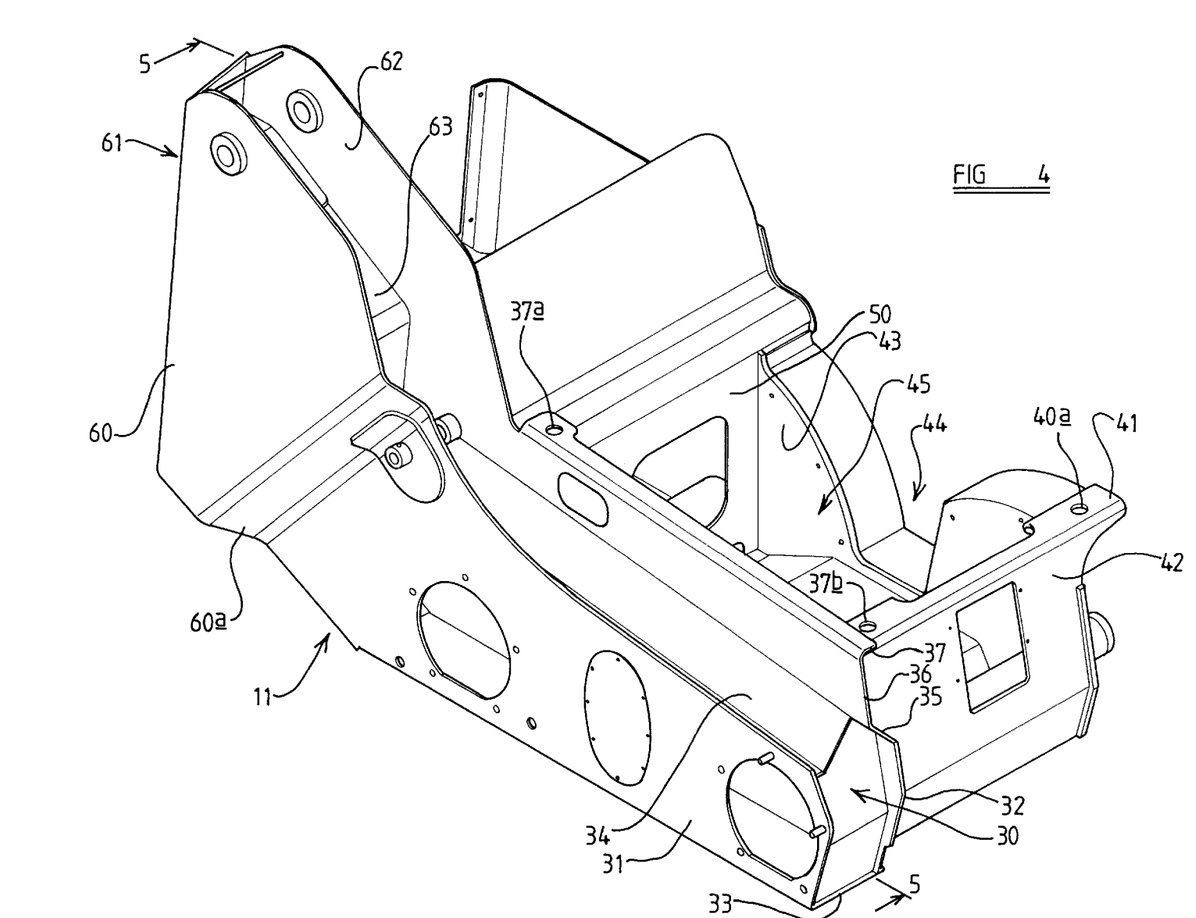
FIG. 4 is a perspective view of a body part of the vehicle of FIG. 1 but with parts omitted for clarity.
Figure 5:
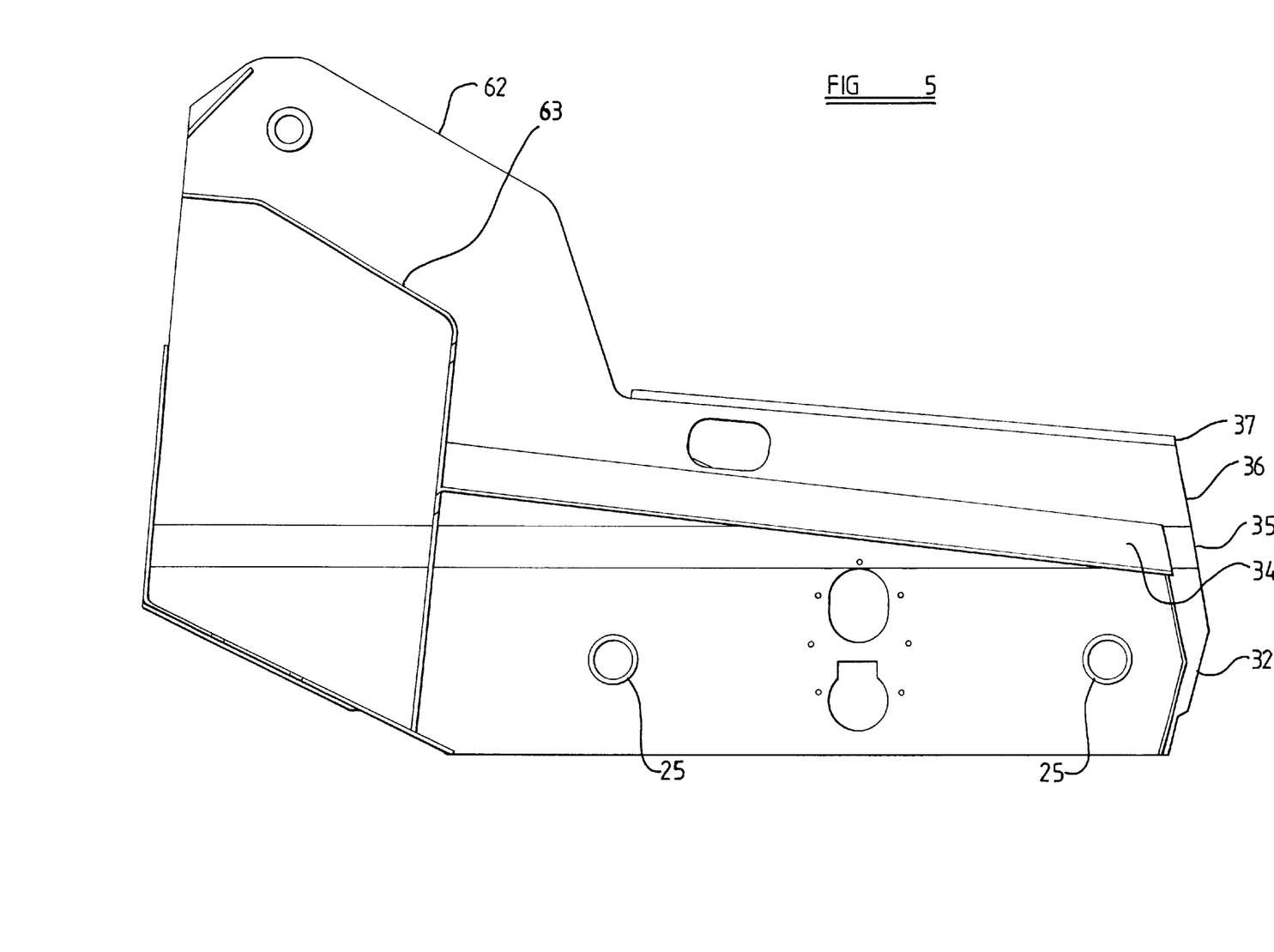
FIG. 5 is a section on the line 55 of FIG. 4.
Figure 6:
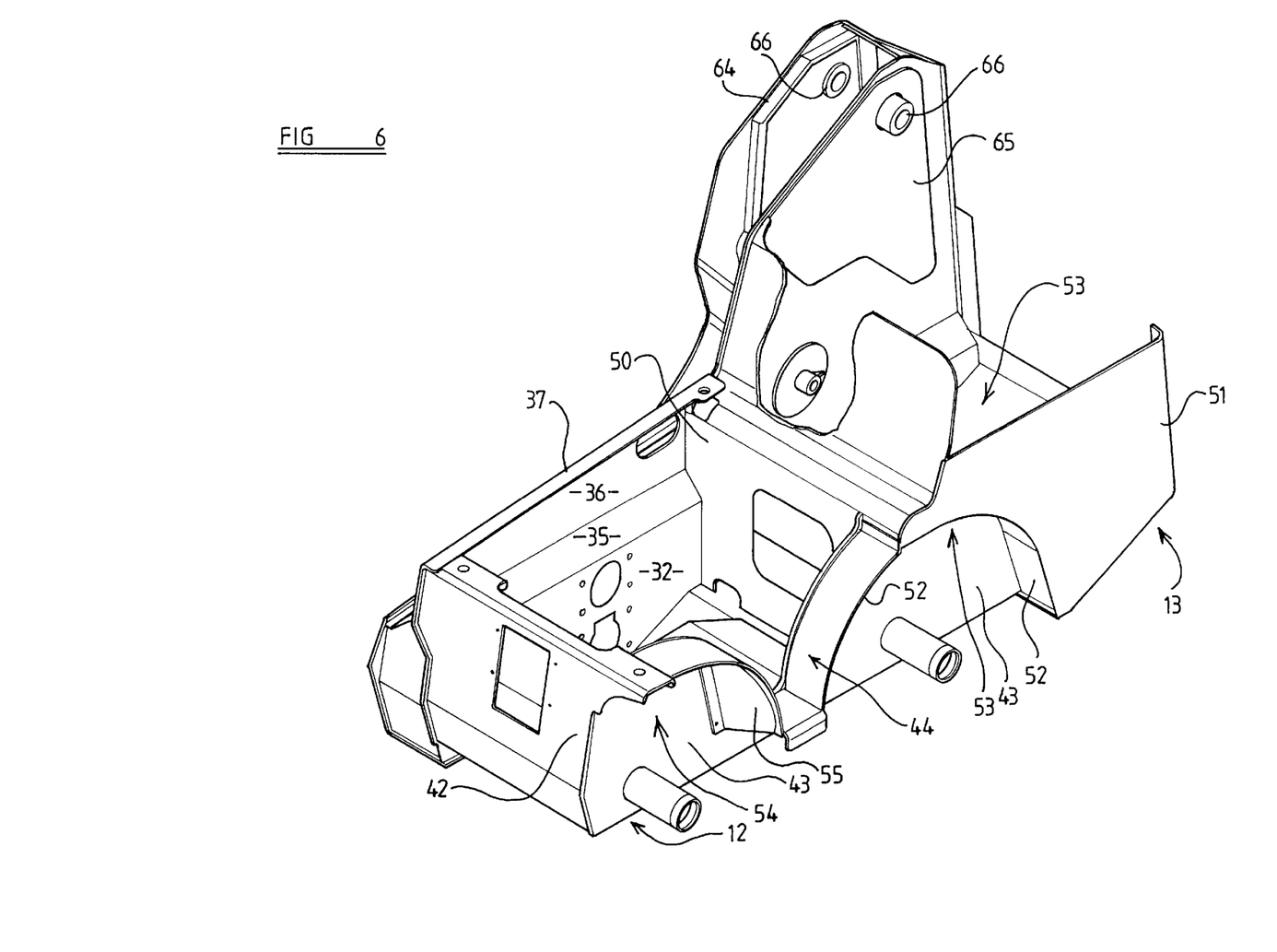
FIG. 6 is a perspective view similar to that of FIG. 4 but taken from the opposite side of the vehicle body.

Referring now particularly to FIGS. 4 to 6, the body 11 comprises, at one side, a single transmission case means 30 comprising a generally planar outer side wall 31 and a generally planar inner side wall 32. The side walls 31, 32 are connected together by a bottom wall 33 and an inclined top wall member 34 which is connected at its outer end to the outer wall 31 and at its inner upper end is connected to an inwardly and upwardly inclined further part 35 integral with of the inner wall 32. In this example the side walls are generally parallel but if desired they may not be.

An extension part 36 is integral with the further part 35 and projects upwardly and is provided with an inwardly directed flange 37 which provides a mounting 37a, for a rear member of a side frame 38 of an operator's compartment 39. A front member of the side frame 38 and a front member of an opposite side frame 40 of the operators compartment are fastened at 37b and at 40a respectively to an inturned flange 41 of a front wall part 42 of the body which extends transversely across the body at the forward end 12 thereof.

A rear member of the frame 40 is mounted on a second transversely extending wall 50.

The frames 38 and 40 are provided with a top wall 46 and may be glazed and/or provided with other parts in conventional manner as desired.

The front wall part 42 is connected to an opposite side wall 43 of the body which is provided with a cut out part 44 to provide access to an internal cavity 45 of the body in which an operator's seat and conventional controls for driving and operation of the lift arm assembly are provided.

The second transversely extending wall 50, is provided between the inner side wall 32 of the transmission case means 30 and the further and extension parts 35, 36 on the one side of the body and the opposite side wall 43 at a position disposed intermediate the front and rear ends 12,13 of the body. It provides a bulk head between the operator's compartment 39 and the engine of the vehicle. The inner side wall 32 of the transmission case means and the further and extension parts 35, 36 extend rearwardly of the transverse wall 50 and together with an extension part 51 of the side wall 43, provide an engine compartment 53 behind the operator's compartment. The extension part 51 is parallel to the side wall 43 but is spaced outwardly thereof by a transversely extending wall 52 which provides a wheel arch 53. A front wheel arch 54 is provided by a further intermediate wall 55. The walls 52 and 55 are secured to the side wall 43 by screw threaded fasteners.

An extension part 60 of the outer side wall 31 of the transmission case means 30 provides one, outer member of an upright or tower 61 whilst an extension part 62 of the inner wall 32 provides an inner side wall of the tower 61. The extension part 60 is parallel to the outer side wall 31 but is spaced outwardly thereof by an inclined part 60a which is integral with the wall 31 and the extension part 60. The tower 61 is reinforced by a transversely extending member 63 and is further reinforced by members 64 and 65. Provided adjacent an upper end of the tower 61 is a pair of mounting bushes 66 by which a single lift arm assembly 67 is pivotally mounted, at its inner end, to the body 10 adjacent the rear end 13 thereof The lift arm assembly 67 is disposed adjacent one side 68 of the operator's compartment 39. The lift arm assembly 67 has receiving means, not shown, for a pivot pin 70, which is received therein and in said bushes 66 to provide a pivot for the lift arm assembly 67.

At its forward end the lift aim assembly 67 has an implement carrying member 71 which projects from a outer or front end 72 of the lift arm assembly 67 and extends transversely across the front end of the body 12 forwardly thereof and has a material handling implement 73 carried thereby so as to be disposed forward of the front end 12 of the body 11. In the present example, the implement 73 is an earth moving bucket although, if desired, other material handling implements may be provided such as a set of forks.

The lift aim assembly 67 is formed as a generally square section tubular fabrication and comprises a major part 74 which extends generally rectilinearly from the inner end 69a of the lift arm assembly towards the outer end 72 and a minor part 74a which extends generally downwardly and forwardly relative to the main part 74 to terminate at the outer end 72 and provided with the implement carrying means 71.

A hydraulic lift ram 75 is pivotally connected between a reinforced part 76 of the outer wall 31 of the transmission case means 30, where it merges with the outer wall 60 fo the tower, and a bracket 77 welded to the lift aim assembly 67 in the region of the junction between the pairs 74 and 75. The pivotal connection of the lift ram 75 at each end comprises a pivot pin 78 which is mounted in pivot bushes welded in openings provided in the respective plates and bracket and extending through apertures provided in the ram at opposite ends thereof. In addition a crowd ram 80 is provided between a pivot pin 81 disposed in cantilever on the lift arm assembly 69 and pivot pin mounting apertures 81a of the implement carrier 71.

Figure 1:
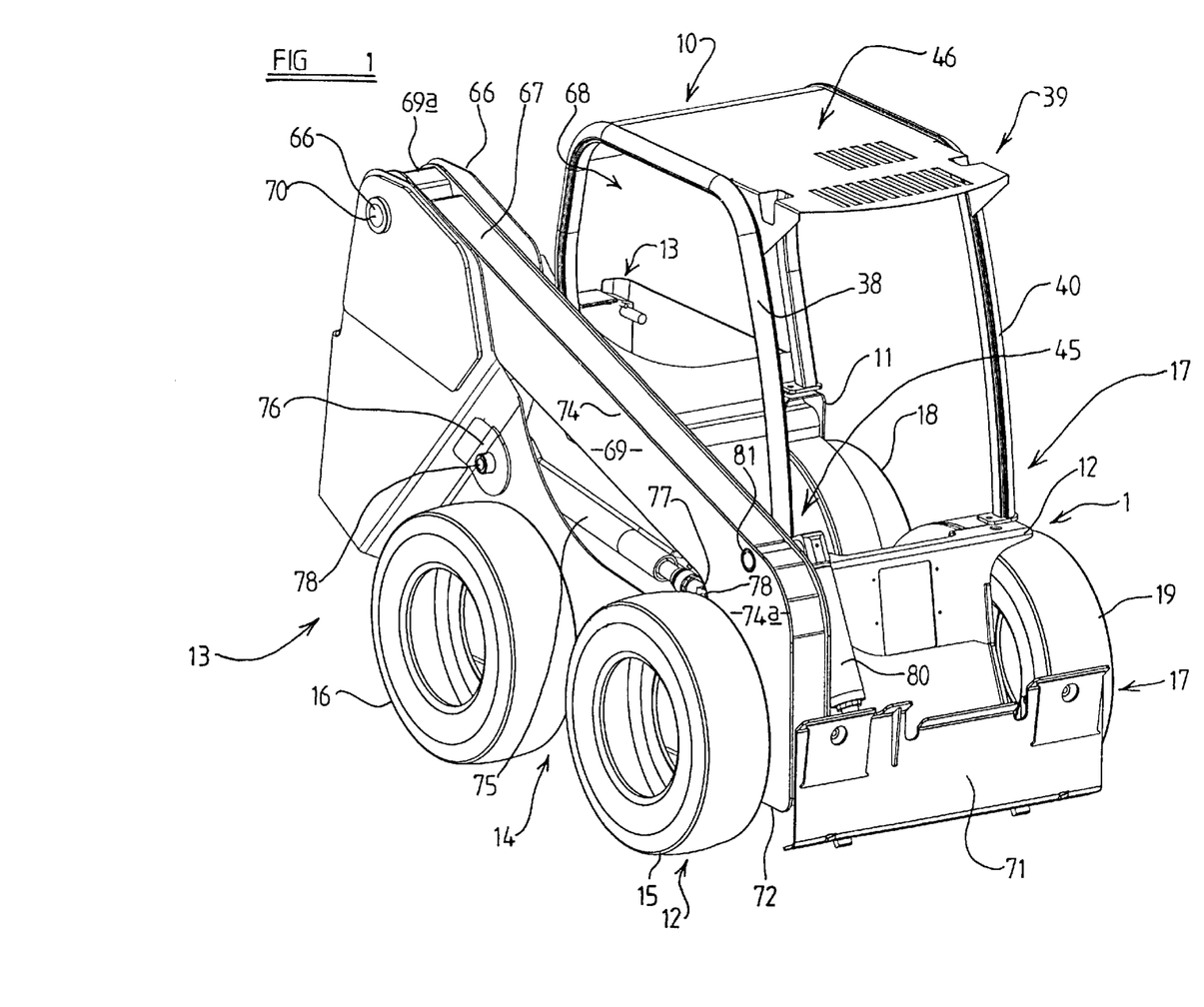
FIG. 1 is a perspective view of a skid steer loader vehicle embodying the invention.
Figure 2:
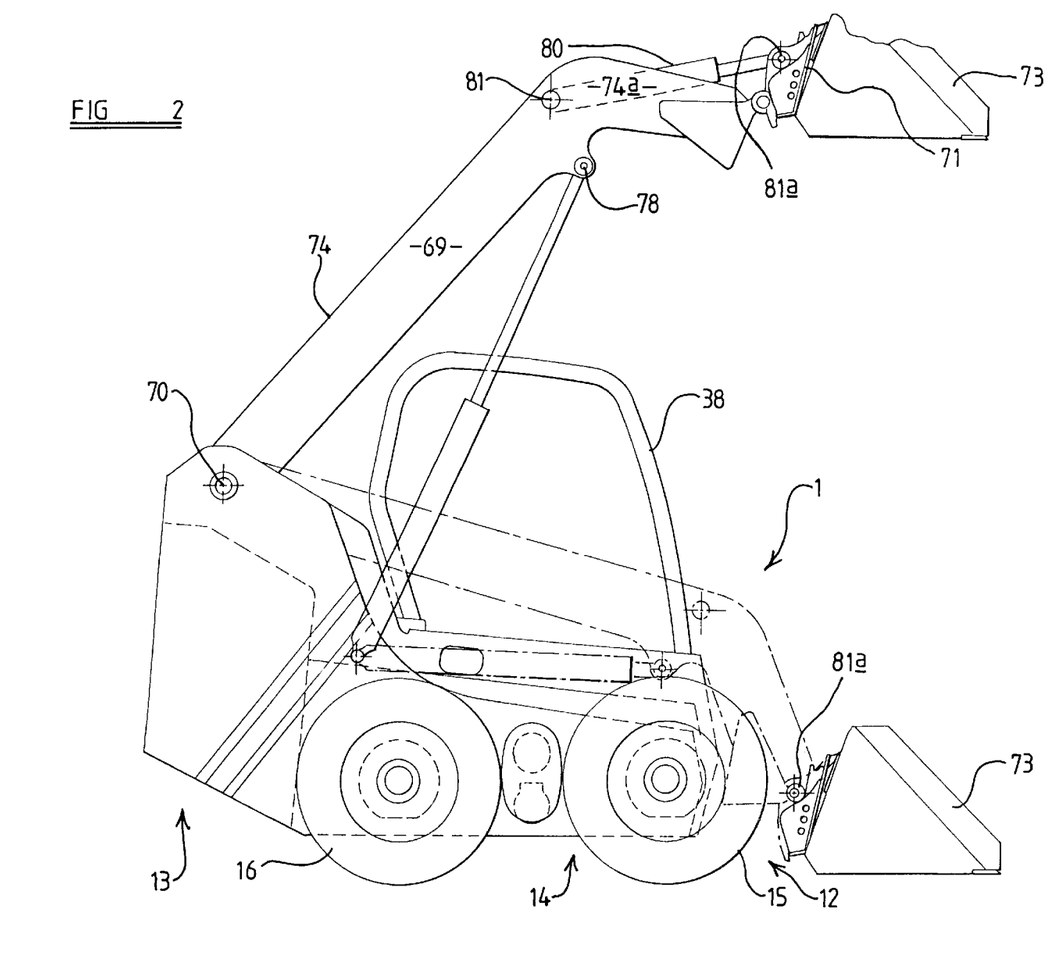
FIG. 2 is a side elevation of the vehicle of FIG. 1.
Figure 3:
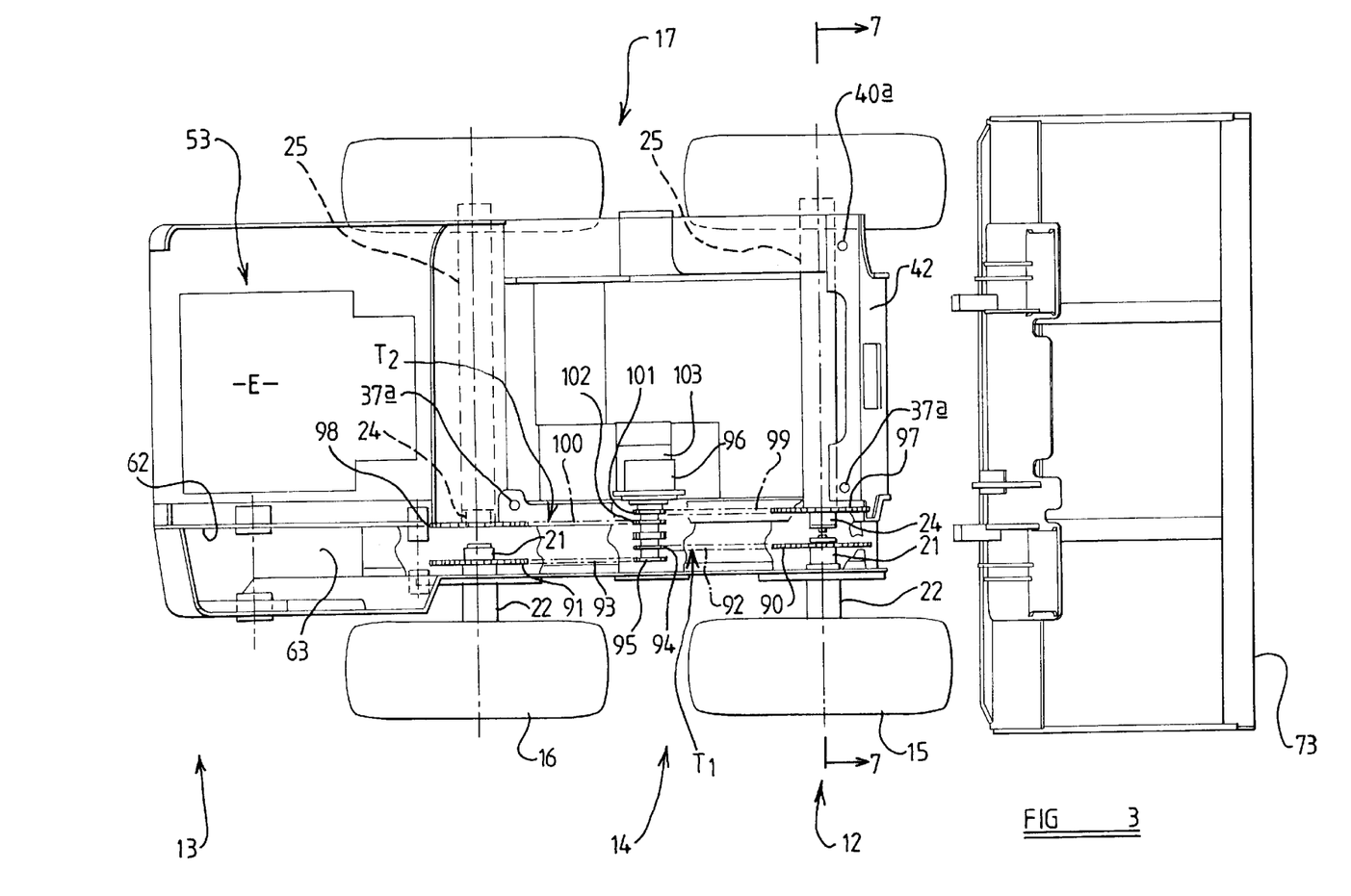
FIG. 3 is a plan view of the vehicle of FIG. 1 but with parts omitted for clarity.
Figure 7:
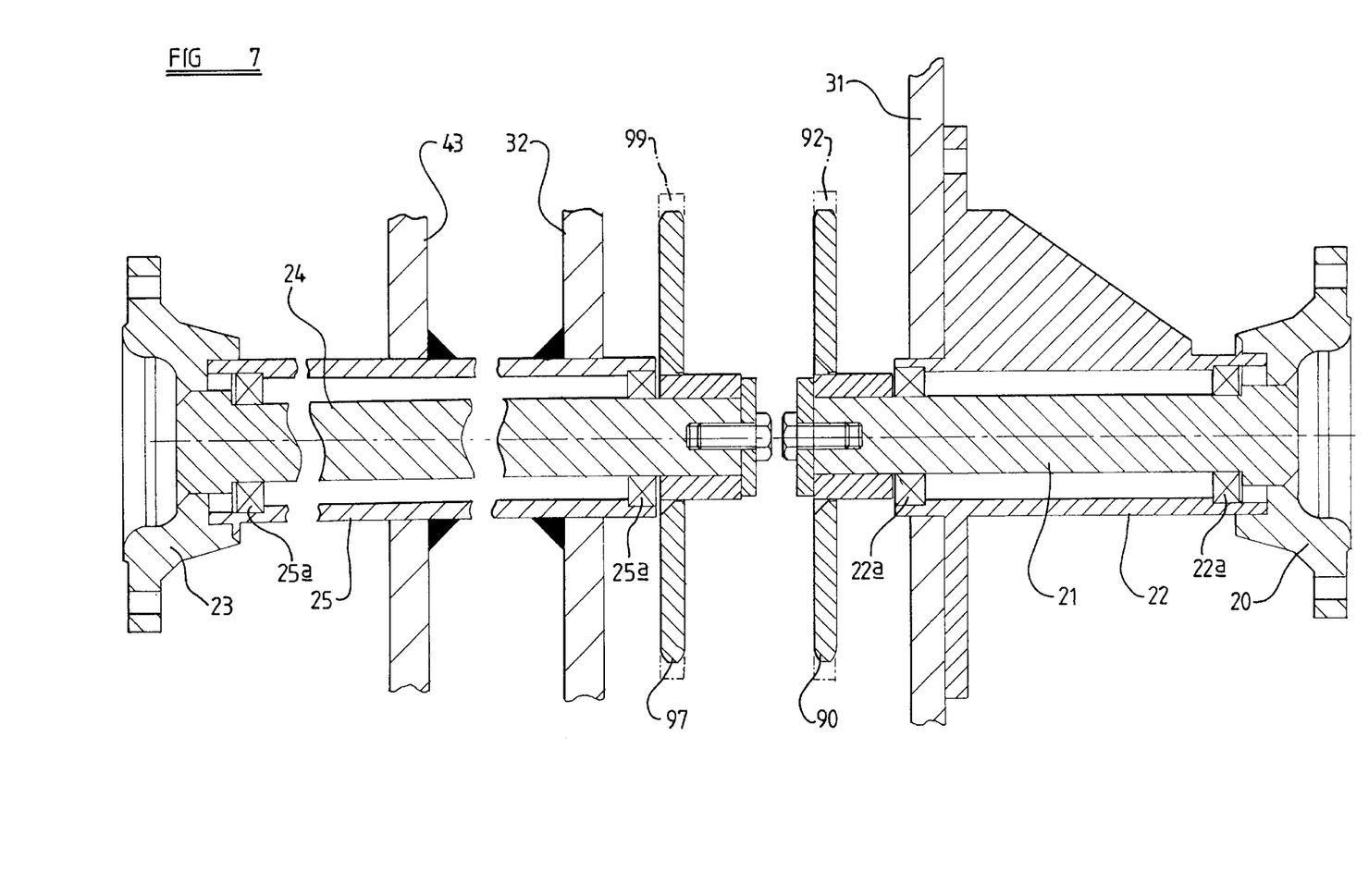
FIG. 7 is a fragmentary section on the line 77 of FIG. 3 with parts omitted for clarity.

Referring now to FIGS. 3 and 7, the transmission case means 30 has therein first and second transmission means T1, T2 by which the first and second propulsion means 14, 17 are driven. Each drive member 21 is provided with first, front and rear, driven wheels 90, 91 respectively, rigidly connected thereto. The driven wheels 90, 91 are connected, by drive loops 92, 93 respectively, to respective drive elements 94, 95 carried on an output shaft of a first hydrostatic drive motor 96.

The drive members 24 are similarly provided with second, front and rear, driven wheels 97, 98 connected by respective drive loops 99, 100 to respective drive elements 101, 102 carried on an output shaft of a second hydro-static drive motor 103 disposed below the motor 96. Of course, if desired, the motor 103 may be disposed above the motor 96.

If desired, the drive elements 94, 95, 101, 102 may be provided on a shaft separate from the motor output shaft but driven thereby.

The first transmission means T1 comprises the first drive member 21, drive wheels 90, 91, drive loops 92,93 and drive elements 94, 95. The second transmission means T2 comprises the second drive members 24, drive wheels 97, 98, drive loops 99, 100 and drive element 101, 102.

In the present example, the driven wheels and drive elements comprise sprockets around which drive loops comprises roller chains are entrained. If desired, however, the drive loops may comprise other means such as toothed or untoothed belts in which case means they would be entrained around suitably configured co-operating drive elements and driven wheels.

The stub axle housings 22 are arranged so that each is bolted to the casing 30 so that it may be rotated and the axis of rotation of the stub shaft being eccentric to the axis of rotation of the housing in a manner similar to that described in EP 0,443,830 so that the tension of the loops 92, 93 may be adjusted.

The tension of the loops 99, 100 is adjusted by moving the drive motor 103 associated therewith vertically up and down relative to the inner member 32 of the loop case means.

If desired, instead of each ground engageable propulsion means comprising two ground engageable wheels each ground engageable propulsion means may comprise an endless track engaged around a pair of guide wheels. At least one of the guide wheels may be carried by hubs 20 or 23 or members similar thereto and have an endless track entrained there around. In this case means, if desired, only one of the guide means may be driven by a guide wheel 90, 91 or 97, 98 from the associated drive element 94, 95 or 101, 102.

Further alternatively, in either case if desired the drive members 21, 24 may be driven by means other than drive loops, for example, by gears or a combination of gears and drive shafts from an associated motor.

An engine, indicated generally at E in FIG. 3 is provided in the engine compartment 50 in conventional manner and connected to one or more hydraulic pumps which are operable by the control means to drive the motors 96, 103 described hereinbefore in conventional manner.

In the above described example the components of the vehicle are conventionally joined together by welding, but if desired, may be joined together by other means such as fasteners. Where components have been described hereinbefore as being integral with each other they may, if desired, be made from discrete elements which are joined together by welding or in any other suitable manner.

Although in the above described example the lift arm assembly and the transmission case means have been described as being provided on the right hand side of the vehicle when facing towards the front of the vehicle, if desired, the configuration of the vehicle may be reversed so that the lift arm assembly and the transmission case means are provided on the left hand side of the vehicle when facing forwardly and a cut out, corresponding to the cut out 44, provided on the right hand side of the vehicle.

The transmission case means described hereinbefore has comprised a single transmission case having only two spaced parallel side walls between which the first and second transmission means are disposed. However, if desired, the transmission case means may comprise two separate transmission cases each having a pair of spaced preferably parallel side walls between each pair of which only one of said transmission means is disposed. The separate transmission cases may be constructed as desired and may be integral with each other or connected together as desired. Further alternatively the transmission case means may comprise two spaced preferably parallel side walls with an intermediate wall disposed there between to form two separate compartments in each of which one of said first or second transmission means is disposed. If desired other configuration of transmission case means may be provided.

The features disclosed in the foregoing description, or the following claims, or the accompanying drawings, expressed in their specific forms or in terms of a means for performing the disclosed function, or a method or process for attaining the disclosed result, or a class or group of substances or compositions, as appropriate, may, separately or in any combination of such features, be utilised for realising the invention in diverse forms thereof.

I claim:

1. A skid steer loader vehicle comprising a body having a front end and a rear end and provided with first and second ground engageable propulsion means respectively disposed on opposite sides of the vehicle and in which the first and second propulsion means are driven by first and second transmission means respectively to permit the vehicle to be propelled and steered by driving the propulsion means on one side of the vehicle, independently from the propulsion means on the other side of the vehicle, an operator's compartment and a boom assembly, the boom assembly having, at an outer end thereof, connecting means for connecting a material handling implement to the boom assembly and an inner end of the boom assembly being pivotally mounted on the body, adjacent the rear end of the body, for movement between a raised position and a lowered position in which the boom assembly extends forwards alongside the operator's compartment and the material handling implement is disposed forward of the front end of the body and a transmission case means, disposed on one side of the vehicle, having therein said first and second transmission means and wherein the first transmission means comprises a front first drive member and a rear first drive member each projecting from one side of transmission case means and drivingly connected to the first ground engageable propulsion means and the second transmission means comprising a front second drive member and a rear second drive member projecting from the opposite side of the transmission case means and extending transversely across the vehicle and drivingly connected to the second around engageable propulsion means.

2. A vehicle according to claim 1 wherein each ground engageable propulsion means comprises two ground engageable wheels.

3. A vehicle according to claim 2 wherein each second ground engageable propulsion wheel of the second ground engageable propulsion means is carried at an outer end of an elongate axle which is housed, so as to be rotatable about an axis of rotation, in an elongate axle housing member mounted on the body, said elongate axle being drivable by a second drive member of the second transmission means, the elongate axle housing is mounted in an aperture of said opposite wall of the transmission case means adjacent one end and in an aperture or other mounting arrangement provided on an opposite side of the body.

4. A vehicle according to claim 3 wherein the body is provided at said one side with said transmission case means and on the opposite side of the body with an opposite side wall.

5. A vehicle according to claim 4 wherein the transmission case means and the opposite side wall of the body is interconnected by front and rear transversely extending parts of the body.

6. A vehicle according to claim 5 wherein the rear transversely extending part is disposed forwardly of the rear of the body to provide an engine compartment between side portions of the body adjacent the rear thereof.

7. A vehicle according to claim 4 wherein the opposite side wall has therein a downwardly extending recess between the front and rear second drive members to provide access to a region of the body disposed between said opposite sides.

8. A vehicle according to claim 2 wherein each ground engageable propulsion wheel of the first ground engageable propulsion means is carried at an outer end of a stub axle which is housed, so as to be rotatable about an axis of rotation, in a stub axle housing member mounted on the body, said stub axle being drivable by a first drive member of the first transmission means.

9. A vehicle according to claim 2 wherein each second ground engageable propulsion wheel of the second ground engageable propulsion means is carried at an outer end of an elongate axle which is housed, so as to be rotatable about an axis of rotation, in an elongate axle housing member mounted on the body, said elongate axle being drivable by a second drive member of the second transmission means.

10. A vehicle according to claim 2 wherein each ground engageable propulsion wheel of the first ground engageable propulsion means is carried at an outer end of a stub axle which is housed, so as to be rotatable about an axis of rotation, in a stub axle housing member mounted on the body, said stub axle being drivable by a first drive member of the first transmission means wherein the stub axle housing member is mounted on said one wall of the transmission case means.

11. A vehicle according to claim 1 wherein each drive member is drivingly connected to a respective driven wheel which is driven from a drive element.

12. A vehicle according to claim 11 wherein the drive elements are carried on shafts driven by motors.

13. A vehicle according to claim 12 wherein each motor is mounted on the same side of the transmission case means as each other.

14. A vehicle according to claim 13 wherein each motor is mounted on one of the outer and inner walls of the transmission case means so as to be disposed outwardly of the case means with the drive element disposed within the transmission case means.

15. A vehicle according to claim 11 wherein the respective driven wheel is driven from the drive elements by a drive loop selected from the group comprising a chain with the drive elements and driven wheels comprising sprockets for engagement with the chain and a belt with the drive elements and driven wheels comprising co-operating pulleys.

16. A vehicle according to claim 1 wherein the transmission case means and the opposite side wall of the body is interconnected by front and rear transversely extending parts of the body and said rear transversely extending part is disposed in front of said rear drive members.

17. A skid steer loader vehicle comprising a body having a front end and a rear end and provided with first and second ground engageable propulsion means respectively disposed on opposite sides of the vehicle and in which the first and second propulsion means are driven by first and second transmission means respectively to permit the vehicle to be propelled and steered by driving the propulsion means on one side of the vehicle, independently from the propulsion means on the other side of the vehicle, an operator's compartment and a boom assembly, the boom assembly having, at an outer end thereof, connecting means for connecting a material handling implement to the boom assembly and an inner end of the boom assembly being pivotally mounted on the body, adjacent the rear end of the body, for movement between a raised position and a lowered position in which the boom assembly extends forwards alongside the operator's compartment and the material handling implement is disposed forward of the front end of the body and a transmission case means, disposed on one side of the vehicle, having therein said first and second transmission means and wherein the transmission case means comprises a pair of spaced side walls between which said first and second transmission means are disposed and the side walls are provided with extension parts which comprise side walls of an upright disposed on said one side of the vehicle and providing, in an upward region thereof, a pivotal mounting means for a boom assembly comprising a single lift arm assembly which extends forwardly along one side only of the operator's compartment when in said lowered position.

18. A vehicle according to claim 17 wherein the first transmission means comprises a first drive member projecting from one side of the transmission case means and drivingly connected to the first ground engageable propulsion means and the second transmission means comprises a second drive member projecting from the opposite side of the transmission case means and extending transversely across the vehicle so as to be drivingly connected to the second ground engageable propulsion means.

* * * * *